United States Patent Office 3,132,860
Patented May 12, 1964

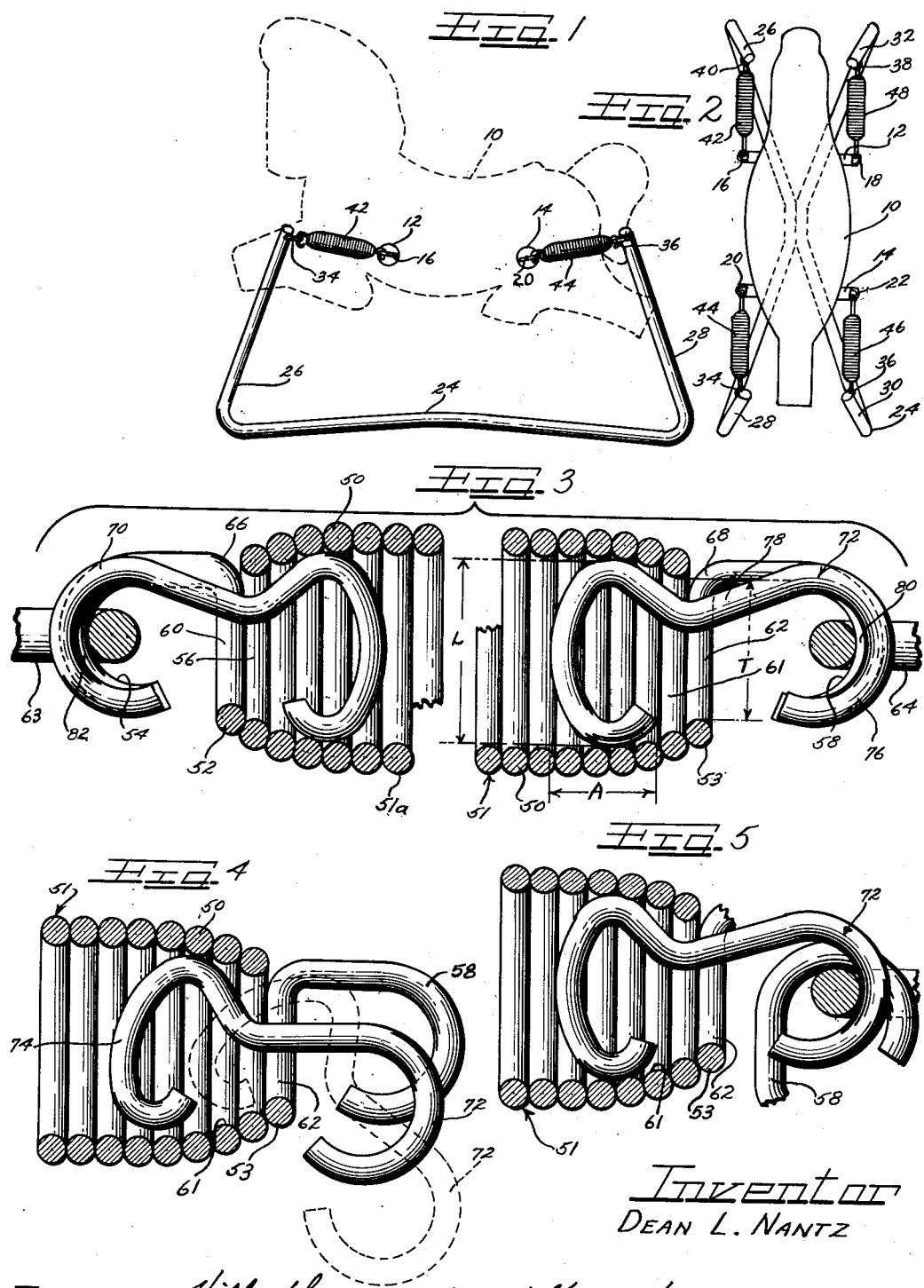

3,132,860
SAFETY COILED SPRING STRUCTURE
Dean L. Nantz, Greenwood, S.C., assignor to Wonder Products Company, Collierville, Tenn., a corporation of Tennessee
Filed Aug. 7, 1957, Ser. No. 676,778
5 Claims. (Cl. 272—52)

The present invention relates to improvements in a spring suspended hobby horse construction, and more particularly to a suspension spring construction for the horse.

Spring suspended horses of the type referred to generally have a toy horse-like body with suspension bars projecting laterally from the body. Suspension springs are connected to the suspension bars and also connected to the upstanding legs of a base or stand. The suspension springs extend in a substantially horizontal direction, and have opposing action to stably support the horse and permit a child rider to be seated on the horse and experience a resilient oscillating motion which permits the horse to move forwardly, rearwardly, upwardly, downwardly, and to both sides. The motion can be made to simulate actual horseback riding movements and the construction has proven very desirable and successful as a riding toy.

An important element of the success has resided in the stability of the horse which has made it safe for use by a child. The stable suspension due to the horizontal opposing acting springs tends to urge the horse to an upright position, and the chance of upsetting the horse has been eliminated.

The present invention contemplates an improvement to the springs which enhances the safety features of spring suspension hobby horses. The springs are commonly constructed of a helically wound heavy spring wire formed with a hook at the end to connect to eyelets on the suspension bars of the horse and eyelets on the stand. Because the metal must be bent sharply to form the hooks at the ends of the spring, and due to concentrations of stress at the base of the hook with continued usage, there is a possibility of failure of the metal at that location.

The invention in its broader concepts provides a safety support mechanism which will support a riding toy such as a horse on failure of a support such as a supporting spring without shock to the toy and rider and automatically providing a support with the same operating characteristics. More specifically, the invention provides a secondary hook at each end of the supporting spring. The secondary hook is connected to the end of the spring and is only slightly longer than a primary supporting hook which is integral with the spring. A secondary hook is provided at each end of the spring and is also hooked through an eyelet in a stand and a suspension bar on the horse. In the event of breakage of the primary integral hook, the secondary hook will continue to support the horse on the spring. The second hook will assume the load of the horse with substantially no movement of the horse evidencing the breakage. Furthermore, the horse will continue to be spring suspended with the same spring characteristic. Thus, breakage will occur without a shock to the horse or rider, and without change in the spring suspension, thus completely avoiding the possibility of injury to the rider due to breakage of the connecting hook at the end of the spring.

Accordingly, it is an object of the present invention to provide a secondary safety support for a supported riding toy or the like such as a spring suspended hobby horse, which will take over and support the primary support such as the supporting springs and thereby avoid the possibility of the rider suffering a fall or being injured.

Another object of the invention is to provide a secondary safety support for a spring suspended riding toy such as a hobby horse which will take over the load of the horse and rider with breakage of a supporting spring eliminating a jerk due to breakage and without creating an unstabling shock to the toy and rider.

A further object of the invention is to provide a secondary safety support for a spring supported riding toy which will receive the weight of the toy and rider in case of breakage of a supporting spring and which will automatically furnish the same resilient support as the spring to avoid causing an upsetting or unstabilizing effect to the toy and rider and permitting the completion of the ride until the oscillation of the toy stops, or permitting temporary usage until the spring can be repaired.

Another object of the invention is to provide an improved spring construction for use with a toy riding member suspended by four spaced laterally opposed springs at the corners of the riding member, the construction provided with a secondary support so that one corner of the riding member will not sag upon failure of a spring.

A still further object of the invention is to provide an improved spring with hooks at the end for connecting to and supporting a riding member, such as a spring suspended hobby horse wherein a secondary or auxiliary hook is provided at the ends for use in the event of breakage of the regular or primary hook, and which can be readily and simply attached or detached at the ends of the spring.

Other objects and advantages will become more apparent with the teaching of the principles of the invention in connection with the disclosure of the preferred embodiments thereof in the specification, claims and drawings, in which:

FIGURE 1 is a side elevational view of an assembly for a spring suspended hobby horse;

FIGURE 2 is a plan view of the spring suspended hobby horse assembly of FIGURE 1;

FIGURE 3 is an enlarged vertical sectional view taken through the axis of a spring for suspending the hobby horse;

FIGURE 4 is an enlarged sectional view taken through the axis of one end of the spring of FIGURE 3, and illustrating the method of attaching the secondary supporting or anchoring hook; and FIGURE 5 is an enlarged sectional view taken through the axis of the spring and illustrating the appearance thereof upon breakage of the primary anchoring hook.

The appearance of a spring suspended hobby horse, of the type wherein the present invention is embodied, is shown in FIGURES 1 and 2. The horse 10 is formed of wood or plastic, or the like which is suitable for mounting and riding by a rider and which has the appearance of a horse or other member suitable and attractive for riding.

The riding member or horse 10 is provided with lateral horizontally extending suspension bars 12 and 14, which project from the sides of the body of the horse 10. At the ends of the suspension bars are eyelets 16 and 18 for the bar 12, and 20 and 22 for the bar 14. These eyelets permit connection of suspension springs for resiliently suspending the horse 10.

The horse 10 is supported from a carrier shown in the form of a base or stand 24. The stand 24 is formed of a bent pipe or tube having four quadrilaterally arranged uprights 26, 28, 30 and 32. At the ends of the uprights are hook receiving eyelets 34, 36, 38 and 40.

The horse 10 is suspended from the uprights of the stand on four individual coil tension springs 42, 44, 46 and 48. The tension springs, as will be further explained in connection with the detailed drawings of FIGURES 3 to 5, are formed of spirally wound spring wire 50.

A spring 51 is shown in detail in FIGURES 3 to 5, having a body 51a which is substantially cylindrical in shape, but which tapers inwardly at the ends 52 and 53 to provide tapering inner surfaces 56 and 61 with the spring having openings 60 and 62 at the ends.

The spring wire is wound to form the last coil of the spring at each end, and at the end 52, the spring wire is bent at right angles at 66 to the coil to extend in an axial direction, and to form a hook 54. The hook is formed to be open so that it may hook through an eyelet 63 which is either on a leg of the stand or on a support bar of the horse.

At the other end of the coil spring, the spring wire is bent outwardly in an axial direction at 68 to form a hook 58 which will hook through an eyelet 64. Thus, the spring will be anchored at its ends by connecting the hooks 54 and 58 to the eyelets 63 and 64 for supporting one corner of the horse 10. Various numbers of springs may be uesd for support and four springs are used in a riding toy in the suspension shown as the preferred embodiment. In this type of suspension, a unique problem is presented inasmuch as failure of any one of the springs will cause immediate unstability and will cause the riding member to tend to throw its rider.

It will be observed that in forming the hooks 54 and 58 from the last coil at the ends 52 and 53 of the spring, a sharp bend must be formed which somewhat weakens the spring wire. In addition to this inherent weakness which may be present, a concentration of bending stress occurs at this location as tension is put on the spring when the rider mounts and rides the horse 10. The continual flexure of the spring in time creates fatigue in the metal and breakage may occur at the location of the sharp bends 66 and 68 at the base of the hooks 54 and 58.

The breakage of the hooks at their bends 66 and 68 will, of course, drop one corner of the horse by releasing the support bar held by the spring. This will immediately cause an unstable condition of the horse, and may tend to throw and injure the rider. To avoid this occurrence, the present invention contemplates providing a structure which will immediately assume the load of the broken spring continuing to support the corner of the horse which is released by the broken spring. The load is assumed in the resilient manner with the same resilient characteristics as the original spring support so that no serious shock will occur to the rider due to the breakage of the spring hook, and the rider can continue his rides until the oscillations of the horse are damped, and then can dismount without having been harmed.

To accomplish this end, a secondary support or hook is provided which is independently connected to the end of the spring. A secondary hook 70 is provided for the end 52 of the spring and another secondary hook 72 is provided at the end 53 of the spring. The secondary hooks 70 and 72 are identical in construction, and, therefore, only one need be described in detail.

The hook 72 has a base 74 which is formed by looping the wire of the hook to form an open bend in the manner shown in FIGURES 3 to 5. The loop is formed so that the lateral dimension "L," shown in FIGURE 3, is slightly smaller than the inside diameter of the body of the spring, but will wedge itself against the inner surface 61 at the tapered end of the spring. This will securely connect the base of the hook 72 to the end 53 of the spring to anchor the spring end.

The hook 72 has a hook end 76 which is substantially the same size and shape as the hook 58 which is integral with the spring. The hook is formed, however, so that the shank 78 which connects the base end 74 and the hook end 76, is sufficiently long so that in normal operation of the spring the hook 76 will not ride against the eyelet 64, but a small space 80 will be present between the eyelet 64 and hook end 76. The hook 70 is formed in the same manner so that a small space 82 will be present between the hook and the eyelet 63. Thus, in normal operation, no stress is placed upon the secondary hooks 70 and 72, but the entire load of the horse is carried from the ends of the spring by the integral hooks 54 and 58.

When breakage of the primary hook 58 occurs, such as shown in FIGURE 5, the load of the horse is immediately assumed by the secondary safety hook 72. Since the space 80 between the secondary hook and the eyelet is very small, this assumption of the load by the secondary hook is accomplished without noticeable shock to the rider who is mounted on the horse 10. Furthermore, the spring 51 will immediately function as a new spring having the new end and will, of course, have the same spring characteristics as in its previous performance. This will permit the rider to continue his ride until the oscillation of the horse recedes whereupon he can dismount. The arrangement permits temporary use of the horse with the auxiliary or safety hook 72 until a new spring can be installed.

The assembly of the second hook 72 on the spring 51 is easily accomplished. For purposes of this assembly, the base end 74 of the hook is looped so that its axial dimension, shown at "A" in FIGURE 3, is smaller than the throat opening "T," as shown in FIGURE 3, at the end of the spring. Thus, by tilting the hook 72 in a lateral direction, as shown in the dotted line position of FIGURE 4, the base end 74 can be slipped into the open throat 62 at the end 54 of the spring. By then rotating the hook 72 to the solid line position of FIGURE 4, it will assume the operating position wherein it extends coaxially with the spring 51.

The hook is formed of a wire similar to the wire of the spring and since it does not have a sharp bend which corresponds to the bend 68 at the base of the hook 58, its strength in some respects is superior to the strength of the primary hook.

In operation, the spring 51 is assembled by placing auxiliary hooks 70 and 72 in each end by tilting them in a lateral direction, and then rotating them to the axial position. Both the integral primary hooks 54 and 58, and the auxiliary hooks 70 and 72 are then hooked through the eyelets 63 and 64. When this is accomplished for each of the springs, the horse 10 will be stably supported from the upright legs 26, 28, 30 and 32 of the stand 24 with the springs extending substantially horizontally and acting in opposition to each other to stably support the horse in an upright position.

Should breakage of one of the hooks occur, such as at its base 66 or 68, as shown in FIGURE 3, the auxiliary hooks 70 or 72 will immediately assume the load without noticeable shock to the horse. The safety hooks 70 and 72 are continually kept in operative position, but are of a dimension such that no stress is placed on them during normal operation. After the breakage of the main hook, the secondary hook will permit the spring to continue operation, and thus the horse will be supported in a manner wherein the normal support characteristic is retained.

Thus, it will be seen that I have provided an improved spring supported hobby horse and an improved spring construction especially suited for the support of the hobby horse which meets the objectives and advantages hereinbefore set forth. The improved spring construction permits operation of the horse in its usual safe manner, and, in addition, greatly enhances the safety of operation inasmuch as breakage can occur without endangering the rider.

The secondary safety hook is constructed so that it will in no way interfere with the operation of the primary hook and does not impede assembly of the springs, and the other parts of the horse. Further, the hook itself is quickly and easily assembled to the spring and requires the addition of no expensive or complicated parts for its assembly or operation.

I, have, in the drawings and specification, presented a detailed disclosure of the preferred embodiments of my invention, and it is to be understood that I do not intend to limit the invention to the specific form disclosed, but intend to cover all modifications, changes and alternative constructions and methods falling within the scope of the principles taught by my invention.

I claim as my invention:

1. A riding assembly resiliently and stably supported for carrying a rider with an oscillating motion comprising in combination a riding member adapted to be supported for mounting and riding, a carrier for supporting the riding member having quadrilaterally arranged uprights, individual tension springs between each of the uprights and the riding member extending substantially horizontally and acting in opposition to each other to stably support the riding member, said springs comprising spirally wound tension springs with connecting integral hooks at the end, means on the carrier and on the riding member for engaging the integral hooks in a manner to support the riding member, and secondary hooks connected between the ends of each of the springs and the uprights and between the ends of each of the springs and the riding member and having an axial length greater than the integral spring hooks whereby no stress is placed on the secondary hooks in normal operation of the spring but the secondary hooks will support the riding member on the spring in the event of failure of the integral hooks with the transition between hooks permitting the spring to continue supporting the riding member.

2. A resiliently and stably supported object adapted to be ridden with an oscillating motion comprising, a riding member adapted for mounting and riding, a plurality of tension springs positioned laterally on opposing sides of the riding member and in substantially a horizontal extending position acting in opposition to each other to stably support the riding member, a carrier for supporting the riding member from the springs, first anchoring means at each end of the springs connecting between the springs and the carrier and the springs and the riding member, and secondary anchoring means connected between the ends of the springs and the carrier and the ends of the springs and the riding member and operative as a support for the riding member upon failure of the first anchoring means whereby the member will continue to be resiliently supported.

3. A resiliently and stably supported object adapted to be ridden with an oscillating motion comprising a riding member adapted for mounting and riding, a plurality of tension springs positioned laterally on opposing sides of the riding member and in substantially a horizontal extending position acting in opposition to each other to stably support the riding member, a carrier for supporting the riding member from the springs, first anchoring means at each end of the springs connecting between the springs and the carrier and the springs and the riding member, and second anchoring means connected between the ends of the springs and the carrier and the ends of the springs and the riding member and operative as a support for the riding member upon failure whereby the member will conti ported, said second anchoring mea the first whereby no stress is placed on the ing means during normal operation.

4. A resiliently and stably supported toy adapted to ridden with an oscillating motion comprising a riding member adapted for mounting and riding, a resilient support for the riding member including a helically wound coil tension spring with at least one end wound to taper inwardly toward the end and form an open end with an inwardly tapering surface, a connector member at said one end, a connector member at the other end of the spring, a carrier for supporting said riding member, said connector members connected to said carrier and to said riding member, an auxiliary connector member for anchoring the spring at said one end having a base of a dimension adapted to fit into the end of the inwardly tapered open spring end in a first position and to be impassible through said open end in a second position whereby the base will wedge against the inside of the tapered spring end for forming an additional connector member for the spring end, and means on said auxiliary connector member attached to said carrier and holding the auxiliary connector member in said second position.

5. A resiliently and stably supported toy adapted to be ridden with an oscillating motion comprising a riding member adapted for mounting and riding, a resilient support for the riding member including a spirally wound coil tension spring with at least one end wound to taper inwardly toward the end and form an open end with an inwardly tapering surface, a connector member at said one end, a connector member at the other end of the spring, a carrier for supporting said riding member, said connector members connected to said carrier and to said riding member, and a secondary connector member at said one end of the spring having a base wedged within the end of the tapered open spring end having a dimension slightly longer than said connector member at said one end whereby in the event of breakage of the connector the secondary connector member will wedge into the tapered spring end to resiliently assimilate the load.

References Cited in the file of this patent

UNITED STATES PATENTS

| | | |
|---|---|---|
| 131,083 | Colvin | Sept. 3, 1872 |
| 659,487 | McMurdy | Oct. 9, 1900 |
| 695,225 | McKee et al. | Mar. 11, 1902 |
| 769,362 | Terry | Sept. 6, 1904 |
| 803,427 | Monroe | Oct. 31, 1905 |
| 841,227 | Chellis | Jan. 15, 1907 |
| 894,008 | Ince | July 21, 1908 |
| 1,577,698 | Eberle | Mar. 23, 1926 |
| 1,589,697 | Howd | June 22, 1926 |
| 1,774,424 | Deal | Aug. 26, 1930 |
| 1,794,911 | Livermore | Mar. 3, 1931 |
| 2,437,015 | Baltz | Mar. 2, 1948 |
| 2,489,482 | Colby | Nov. 29, 1949 |
| 2,624,579 | Savella et al. | Jan. 6, 1953 |
| 2,707,633 | Wiley et al. | May 3, 1955 |
| 2,729,271 | Hayes | Jan. 3, 1956 |
| 2,758,632 | Koller et al. | Aug. 14, 1956 |
| 2,924,448 | Nantz | Feb. 9, 1960 |